W. T. B. ROBERTS.
MACHINE FOR USE IN THE MANUFACTURE OF BOOTS AND SHOES.
APPLICATION FILED JUNE 10, 1914.

1,255,641.

Patented Feb. 5, 1918.

WITNESSES

INVENTOR

W. T. B. ROBERTS.
MACHINE FOR USE IN THE MANUFACTURE OF BOOTS AND SHOES.
APPLICATION FILED JUNE 10, 1914.

1,255,641.

Patented Feb. 5, 1918.
7 SHEETS—SHEET 3.

WITNESSES
Elizabeth C. Coule
Edith C. Holbrook

INVENTOR
William T. B. Roberts
By his Attorney,
Nelson M. Howard

W. T. B. ROBERTS.
MACHINE FOR USE IN THE MANUFACTURE OF BOOTS AND SHOES.
APPLICATION FILED JUNE 10, 1914.

1,255,641.

Patented Feb. 5, 1918.
7 SHEETS—SHEET 5.

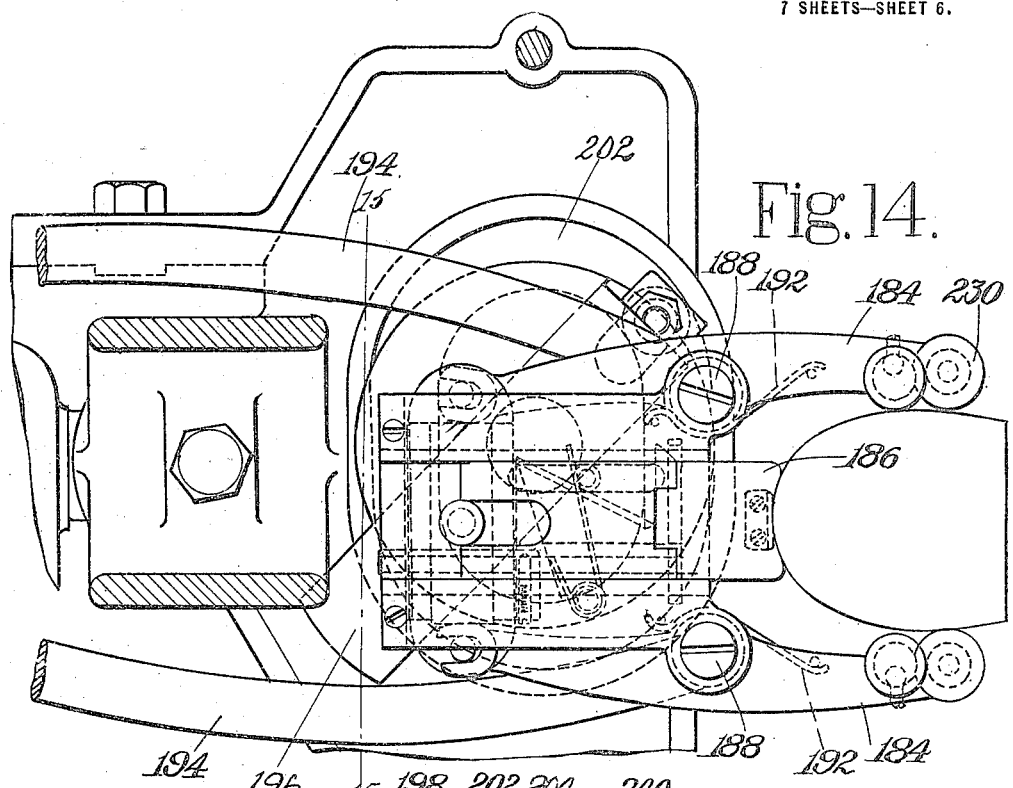
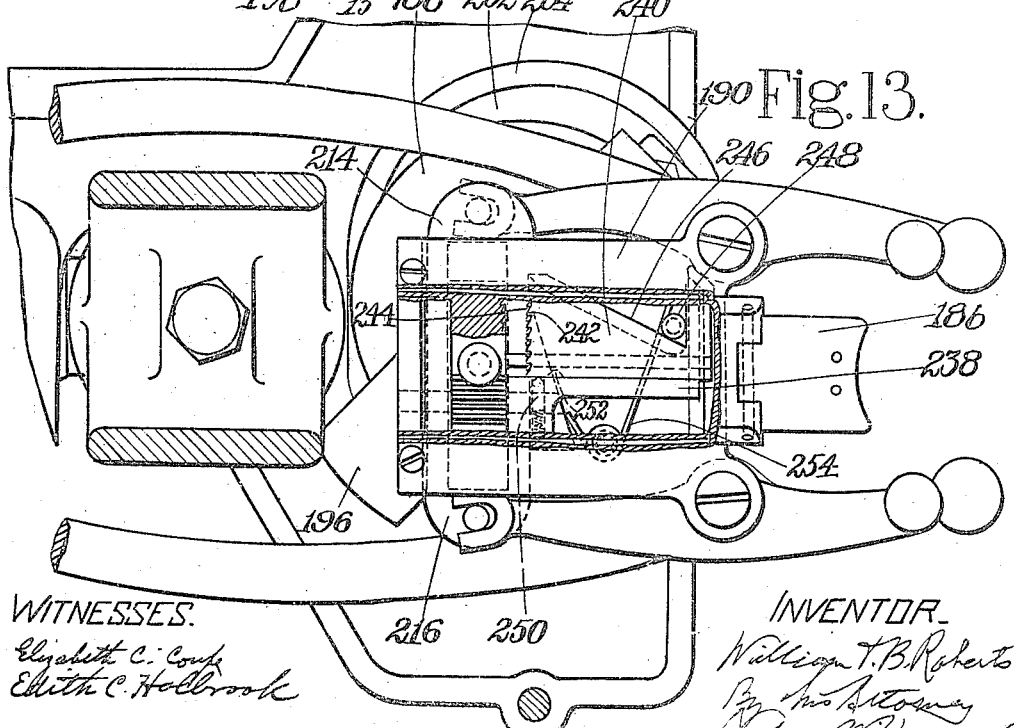

UNITED STATES PATENT OFFICE.

WILLIAM THOMAS BUCKINGHAM ROBERTS, OF LEICESTER, ENGLAND, ASSIGNOR, BY MESNE ASSIGNMENTS, TO UNITED SHOE MACHINERY CORPORATION, OF PATERSON, NEW JERSEY, A CORPORATION OF NEW JERSEY.

MACHINE FOR USE IN THE MANUFACTURE OF BOOTS AND SHOES.

1,255,641.  Specification of Letters Patent.  Patented Feb. 5, 1918.

Application filed June 10, 1914. Serial No. 844,221.

*To all whom it may concern:*

Be it known that I, WILLIAM THOMAS BUCKINGHAM ROBERTS, a subject of the King of England, and resident of Leicester, Leicestershire, England, have invented certain Improvements in Machines for Use in the Manufacture of Boots and Shoes, of which the following description, in connection with the accompanying drawings, is a specification, like reference characters on the drawings indicating like parts in the several figures.

This invention relates to machines for use in the manufacture of boots and shoes and more particularly to mechanism for positioning and supporting the work in such machines and for controlling the presentation of the work to the operating tool or tools. The invention is herein shown and described as embodied in a machine for inserting fastenings in the heel seat of a shoe sole, but it will be obvious that the invention is not restricted to its illustrated use and that it is of wide applicability in the art to which it particularly relates.

The machine to which the invention is shown as applied is of the type more fully described in United States Letters Patent to Louis Goddu No. 490,623, granted January 24, 1893, and comprises fastening inserting mechanism past which the work to be operated upon is moved between the successive operations thereon. This machine is ordinarily not provided with work feeding mechanism, nor even with work supporting mechanism, the machine being used for the most part in inserting fastenings into the soles of shoes supported upon lasts and the inertia of the last being sufficient to overcome the downward thrust of the fastening inserting operation.

Although work supports and work feeding means are commonly incorporated in machines for inserting fastenings, these elements are usually so arranged in conjunction with edge guiding means that the work is fed along a path parallel to its edge contour, the work being turned upon the work support as the operations upon the work proceed about the curved portions thereof. In the co-pending application of Arthur Bates, Serial No. 443,666, filed July 15, 1908, which matured into Patent No. 1,115,484 on Nov. 3, 1914, work feeding and guiding means of a novel type is illustrated and described, the said work feeding and guiding means being so constructed and arranged that it feeds the work past a stationary inserting mechanism in such manner that a row of fastenings will be inserted substantially parallel to its edge while the same face of the work is constantly presented to the operator.

The feeding, guiding, and supporting mechanism shown in the machine of said co-pending application permits the operator to thrust the work into a work holder or work support and without changing the direction of his pressure upon the work to maintain it constantly in proper relation to the machine throughout the operation of the machine thereon, said mechanism, like that herein illustrated, comprising means for clamping the work, in both cases the heel end of a shoe, and for traversing the work beneath the fastening inserting mechanism in a predetermined path, while the inserting mechanism is intermittently operated to insert fastenings. The feeding and guiding mechanism is so constructed and arranged that the predetermined path follows substantially the contour of the heel end of the shoe, that is the path is substantially U shaped, and provision is made for varying the curve of the path of travel of the work guiding means to suit it to varying sizes of shoes.

While the machine described in said co-pending application was generally successful in operation it was found in practice that the work was not supplied in sufficiently large quantities of the same size and that the adjustment to different sizes could not be utilized advantageously since its employment involved a considerable loss of time. In order to overcome this objection a principal object of the present invention is to provide means for quickly and easily and, preferably, automatically adjusting the path of travel of the clamp or other work holding means in accordance with the size of the work engaged by said holding means. Thus, without particular attention on the part of the operator the path traversed by the clamp or work holding means will remain constant when shoes of the same size are being operated upon and will be altered for any variation in size.

In its broader aspects the invention contemplates the provision of automatic work feeding and guiding mechanism to which the operator will simply present the shoe or other work to be operated on and which will then automatically carry the work bodily past the operating tool along a path suited to the size or some other characteristic of the work. The presentation of the work to this automatic mechanism may involve simply the insertion of the work into a work holder which adjusts itself automatically to the work or, as in one of the illustrated forms of the invention, the adjustment of the work holder to the work may be effected manually.

In order that the work feeding movement of the feeding and guiding mechanism may be suited to other requirements, provision is made for adjusting this mechanism to vary the rate of feeding or to vary the amount of feeding movement between successive fastening insertions whereby, in combination with the provision for varying the path of movement of the work, the number of operations performed upon the work can be maintained constant notwithstanding variation in the size of the work, or different numbers of operations can be performed upon the same or upon different sizes.

Important features of the invention comprise the provision of improved cut-out mechanism or means for stopping the traversing movement of the work holder at the conclusion of each series of operations on the work, and improved means for reversing the traversing movement whereby successive pieces of work will be moved in opposite directions past the point of operation of the inserting mechanism or other means for operating upon the work.

Other objects and important features of the invention will appear from the following description and claims when considered in connection with the accompanying drawings.

In the accompanying drawings Figures 1-12 inclusive show the invention embodied in a fastening inserting machine of the type herein above referred to wherein the heel clamp is closed upon the heel after the heel has been inserted in said clamp by manually operated means which at the same time through operative connections sets the mechanism by which the heel is traversed beneath the fastening inserting mechanism so that the clamp describes a path corresponding to the size of the heel clamped.

Figs. 13-15 inclusive show the invention embodied in the same type of machine but so constructed and arranged that the mechanism which traverses the heel beneath the inserting means is set to suit the path of movement to the size of the heel as the heel is inserted in the heel clamp, the heel being then automatically locked within the heel clamp.

Describing the figures of the drawings more particularly:—

Fig. 13 is a plan view of the clamp of the automatically operated clamping means showing the clamp before the heel is inserted;

Fig. 14 is a plan similar to Fig. 13 but with the parts in the position they assume when the heel has been pushed into the clamp;

Figure 1:
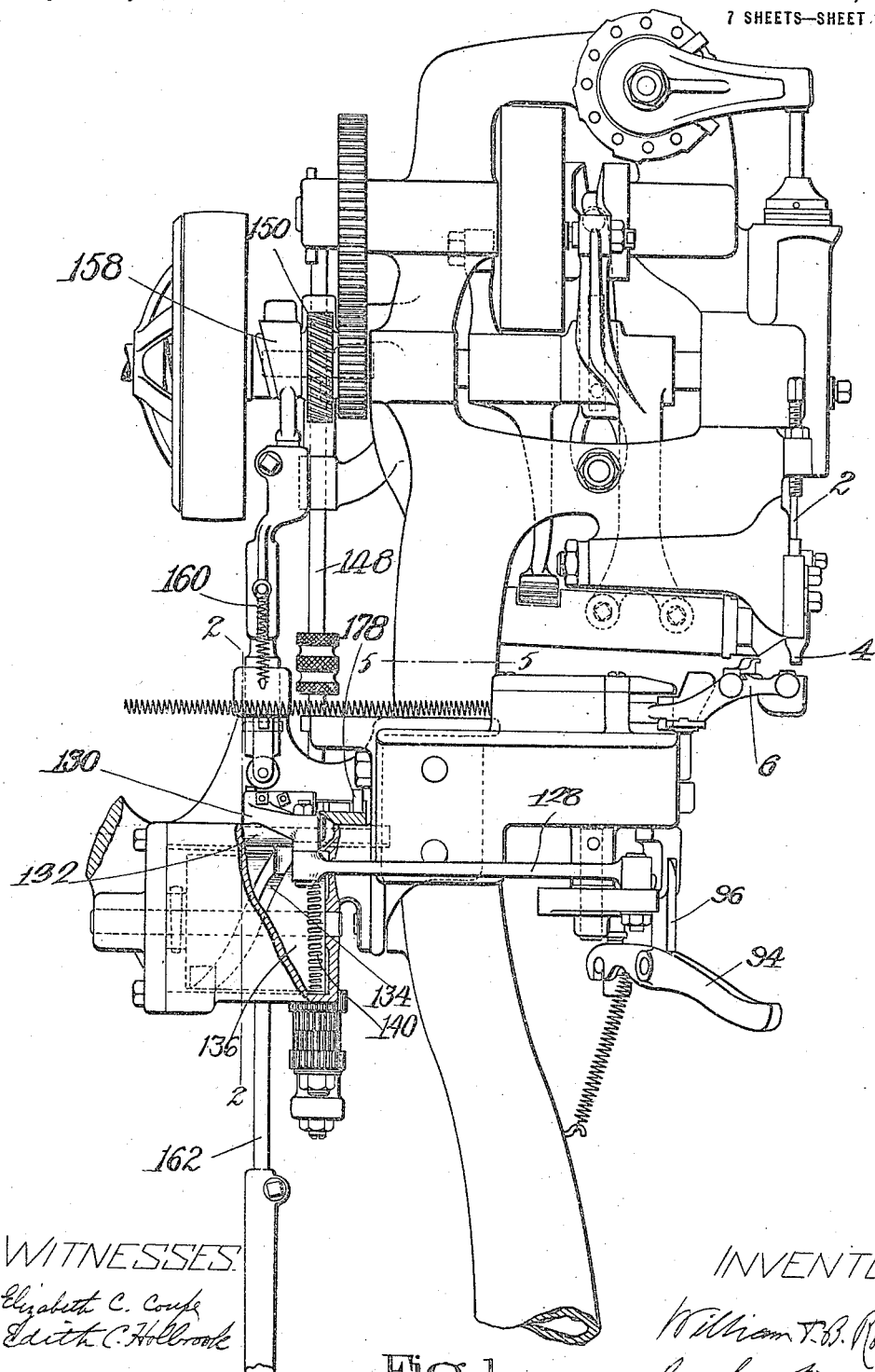
Fig. 1 is a side elevation of the upper part of the machine.
Figure 3:
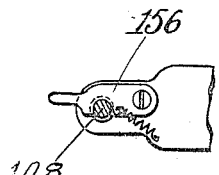
Fig. 3 is a section on the line 3—3 Fig. 2 showing a detail of construction.

The machine shown in the several figures of the drawings, like the machine of the Letters Patent hereinabove referred to, comprises mechanism by which taper nails or tacks are cut from a peg strip and are then driven into the work by a driver 2 through a nozzle 4 to which the work is presented, this nozzle occupying a fixed position in the machine. Beneath the nozzle a heel clamp, indicated generally in Fig. 1 at 6, is located, this clamp, as hereinafter more particularly described, being operated to carry the shoe along such a path that tacks or nails are driven into the heel seat in a row that is substantially parallel to the contour of the edge of the heel seat. As hereinabove pointed out, according to this invention the heel clamp 6 is constructed in such manner and connected with its operating mechanism in such a way that the operation of clamping the shoe will set the mechanism to determine the path to be described by the clamp during its traversing movement in such manner that the said path will vary in accordance with the variation in the sizes of the heel seats being dealt with.

The heel clamp 6 comprises clamping members 8 (Figs. 5 and 6) adapted to engage the sides of the heel end of the shoe and a member 10 adapted to engage the rear end of the heel or counter part of the shoe. Each side clamping member forms part of one of two lever arms 12 fulcrumed at two points 14 on a carrier plate 16. Means, hereinafter more fully described, is provided for causing the front ends of the lever arms to be moved toward one another to clamp the heel, this means acting upon the rear ends of said arms.

The side clamp members 8 are arranged so as to be capable of adjustment and also to be capable of yielding angularly to accommodate themselves to the varying inclinations of the sides of the heel end of the shoe. For this purpose each of the clamping members 8 conveniently consists of a block (see Fig. 5) adapted to turn upon a pin 18 on the lever in opposition to a spring 20 which is held between an extension upon said block and the lever arm 12. The block may also have a slot 22 where it engages the pin 18 and its position in relation to said pin and consequently the extent to which it projects from the lever arm 12 may be adjusted by a screw 24 threaded in said lever arm and engaging said block. Other blocks 26 may also be provided on the lever arms 12 to engage the heel seat face, the said blocks being mounted in guide ways in the arms 12 and being adjusted by means of screws 28 threaded in said arms.

The rear heel engaging member 10 is slidingly mounted in the carrier plate 16 between the side clamping members 8 and is arranged to be moved outwardly from the plate 16 in proportion to the relative inward movement of the side members 8. For this purpose the heel engaging member 10 is provided with a stem or slide rod 30 which is received in a bore in the carrier plate 16 and is normally drawn toward the rear by a spring 32 connected at one end to said stem and at the other end to the plate 16. To move the heel engaging member 10 forwardly in opposition to the spring 32, inclined or cam surfaces 34 are provided on the lever arms 12, each of these surfaces engaging a roll or runner 36 pivoted in the heel engaging member 10 whereby, when the side arms 12 are moved toward each other, the inclines 34 will act on the rollers 36 and move the heel engaging member 10 forward. The inclines or cam surfaces 34 may be formed on the side lever arms 12, or, as shown, each may be constructed as a separate block 38 secured to the arm by a screw 40, in which latter case by the provision of a guideway 42 and a slot connection between the screw and the block the cam faces 34 may be adjusted with respect to the arms 12.

Figure 5:
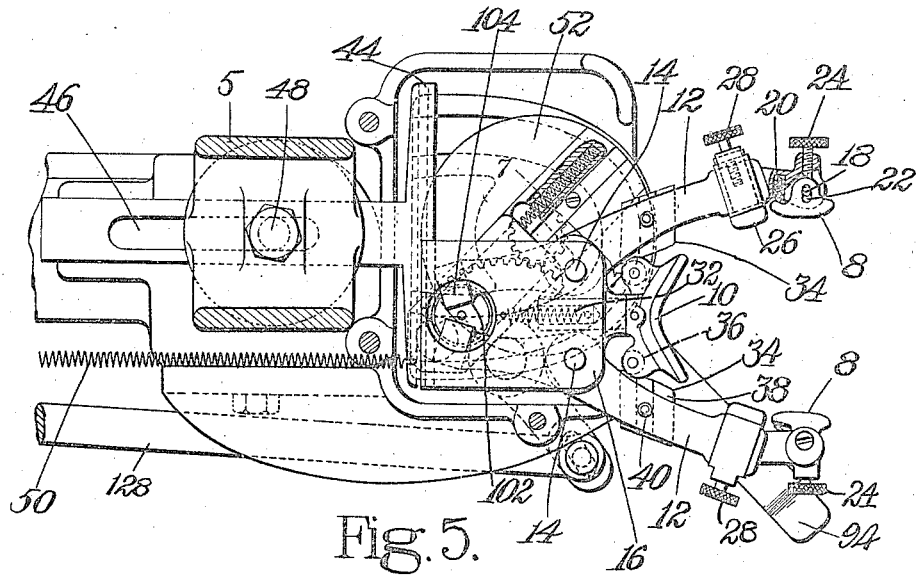
Fig. 5 is a plan of the heel clamp showing the parts in the position they occupy when the clamp is open and before the heel is inserted.
Figure 6:
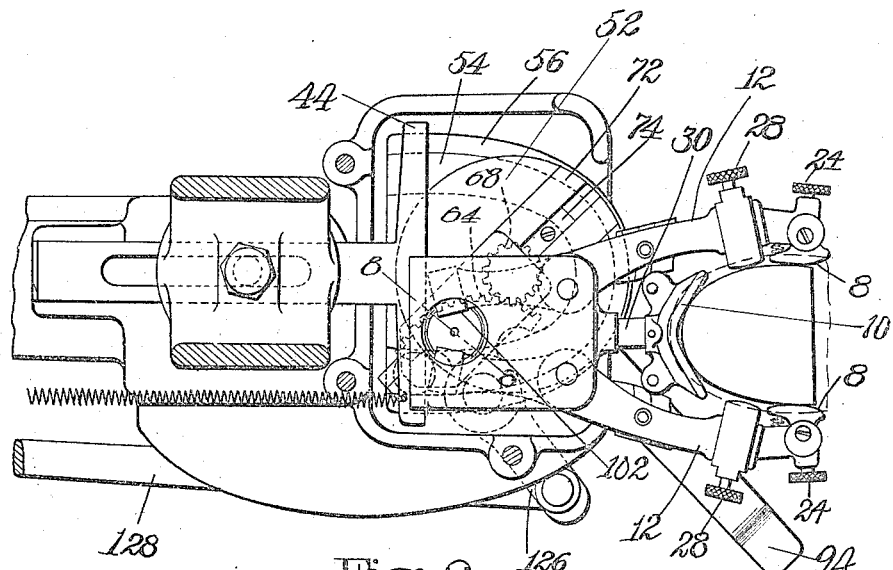
Fig. 6 is a view similar to Fig. 5 with the parts in the position they assume when a heel has been inserted and the manually operable member has been actuated.

As it is necessary that the rail or tack shall always have a definite location with respect to the breast edge of the heel and of the shoe irrespective of the size of the heel, the heel clamp 6 as a whole has a movement forward during the clamping operation in addition to the forward movement of the rear heel engaging member 10, as may be seen by comparing Figs. 5 and 6 of the drawings.

It will thus be seen that a part of the adjustment for compensating for the variation in the length of the heel end of the shoe is effected by a bodily forward movement of the clamp or work holder and that the other part of the adjustment is effected by the movement forward of the heel engaging member 10.

The carrier plate 16, which has already been referred to as having the lever arms 12 fulcrumed upon it, is free to move laterally in either direction but is restrained from angular movement. This freedom of motion is provided for in the direction across the machine by a groove and lip connection with a T-shaped guider 44 which is arranged for movement endwise in a recess in the frame 5 of the machine. This endwise movement of the guider 44 thus permits the movement of the carrier plate 16 in a direction at right angles to the movement provided for by the groove and lip connection. The guider 44 is provided with a slot 46 through which passes the bolt 48 by which the head of the machine is attached to the base and said guider is normally drawn toward its rearmost position by a spring 50.

The movement of the heel clamp or work holder 6 by which the work is carried past the inserting mechanism, this movement being herein frequently referred to as the traversing movement of said clamp or work holder, is effected by connections with an oscillatory crosshead 52, the carrier plate being connected to said crosshead by a chain of adjustable connections. As hereinabove pointed out, the plate 16 is constrained from angular movement but is free to move in lateral directions normal to each other, and by means now to be described the plate is caused to move bodily along a path that corresponds substantially with the contour of the work in the work holder. The means for compounding the two rectilinear movements of the plate 16 into a bodily movement of said plate along a path corresponding substantially to the contour of the work comprises a cam groove 54 of substantially heel-shape or horseshoe shape, said groove being formed in a plate 56 rigidly secured to the machine frame, the plate herein shown being provided with a hub 58 secured in a boss 60. A cam roll 62 connected with the plate 16 travels in said cam groove 54. During the rotary movement of the crosshead 52 the carrier plate 16 will be constrained to follow the path described by the cam and the size of the heel-shaped or horseshoe-shaped path traversed by the plate 16 will vary in accordance with the variation of the distance from the center of oscillation of the crosshead 52 to the point at which the carrier plate 16 is connected to said crosshead. The size of the path of travel of the carrier plate 16 may thus be accommodated to the size of the heel and will be accommodated to the size of the heel by means hereinafter to be described.

The crosshead 52 is oscillated by a toothed segment 64 arranged to oscillate upon a stud 66 depending from the frame 5, said segment engaging a pinion 68 formed on or attached to the hub 70 of the crosshead 52, said hub 70 having its bearing within the hub 58 of the cam plate 56 and projecting below the lower end of said hub 58. Means for imparting oscillatory movements to the segment 64 is hereinafter described.

Figure 4:
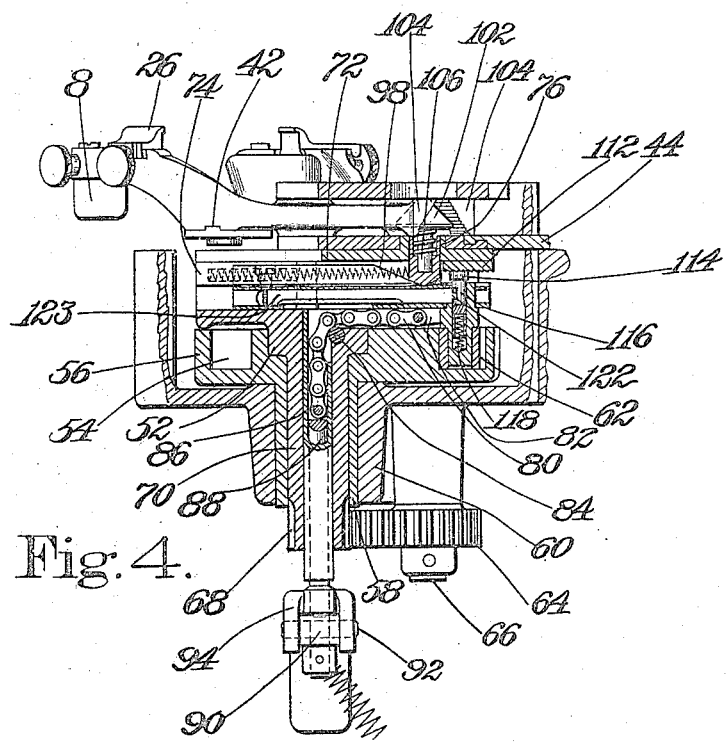
Fig. 4 is a vertical section of the heel clamp illustrated in Figs. 1 and 2.

The adjustable connections between the oscillatory crosshead 52 and the carrier plate 16 comprise two sliders 72 and 74, see particularly Fig. 4, which are mounted in and turn with the crosshead 52, being arranged to slide across said crosshead along a diameter thereof. The slider 72 carries a boss or bearing 76 which fits into and is received within an opening in the carrier plate 16 and the other slider 74 carries the roller 62 that is received in the cam groove 54 of the cam plate 56. The boss or bearing 76 constitutes the adjustable point of connection hereinbefore referred to between the oscillatory crosshead 52 and the carrier plate 16. The two sliders 72 and 74 are coupled together or locked together by means hereinafter described so that during the traversing movement of the clamp or work holder 6 they act as a single slider to slide backwardly and forwardly in a bearing or guideway in the crosshead 52 while the roller 62 follows the cam path 54. However, during the adjustment of the mechanism to accommodate different sizes of heel seats, the two sliders have a relative movement and for this purpose the slider 72 is mounted in a slideway in the oscillatory crosshead 52, as shown in detail in Figs. 4 and 8, and is acted upon by springs 78 which tend to move the slider 72 into its normal position in which position the boss or bearing 76 that connects it with the carrier plate 16 is removed to its extreme position away from the center of oscillation of the crosshead 52 and nearest to the axis of the roll 62. This normal position is intended to take care of the heel seat of the largest size for which the machine can be used.

To effect the movement of the boss 76 in the other direction and thus adjust the mechanism for heel seats of smaller size, such adjustment taking place against the tendency of the springs 78 to move the boss into its normal position, the following means is provided: A chain 80 coupled at one end to a lug 82 projecting downwardly from the slider 72 passes over a roll 84 and is led through a sleeve 86 within a bore in the hub 70 of the cross head 52. At its other end the chain 80 is connected to a rod 88 sliding within the sleeve 86 and this rod is provided with a collar 90 carrying trunnions 92 received in the bifurcated end of a hand lever 94. The hand leved 94 is fulcrumed in the lower end of a link 96 hung from the machine frame, so as to provide for its curvilinear movement when turned, and as the chain 80 and its connected rod 88 pass centrally down through the hub 70 of the crosshead 52 and the rod 88 is connected to the hand lever 94 by means of the collar 90, free to turn upon said rod, the crosshead 52 can be turned without interfering with the operation of said hand lever. By lifting the handle end of said hand lever 94 the rod 88 will be drawn down in the sleeve 86 and through the chain connection 80 the upper slider 72 will be moved relatively to the lower slider 74 to bring the boss of bearing 76 which forms the connection between the slider 72 and the carrier plate 16 nearer to the center of oscillation of the crosshead 52. Release of the hand lever 94 permits the springs 78 to return the slider 72 to its normal position and at the same time effect other operations, hereinafter to be described, through the agency of the sleeve 86.

Figure 9:
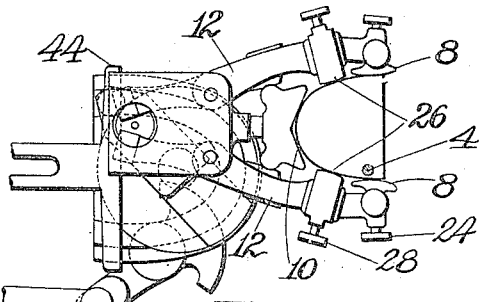
Figs. 9-12 are diagrammatic plans illustrating the progressive movement of the heel clamp in traversing the heel under the fastening inserting means, the nozzle of the machine being shown in section in the different figures.
Figure 10:
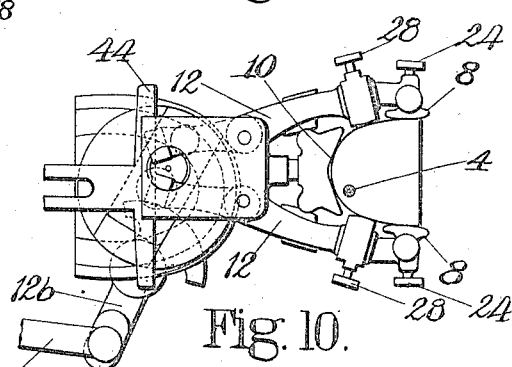
Figure 11:
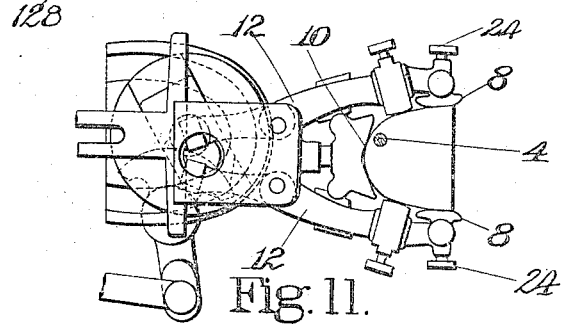
Figure 12:
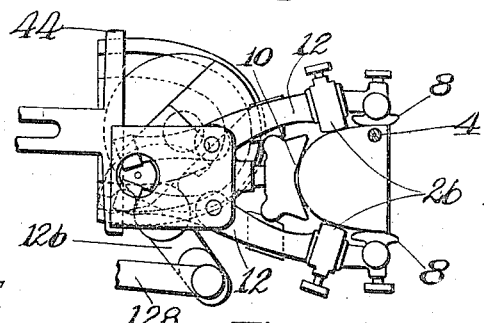

As hereinabove stated, the path described by the heel clamp or work holder 6 in its traversing movement is altered in accordance with the variations in the sizes of the shoes presented to the machine. In other words, the means for setting the mechanism to determine the path described by the heel clamp or work holder is so correlated to the means for clamping the heel that the setting movement is dependent upon the extent of movement required in the clamping operation. The correlation of these movements is effected through the following mechanism: The lower slider 74 in the crosshead is provided with a wedge surface 98 which engages with the conical lower end of a plunger 100, see Figs. 4 and 8, that is mounted in the boss or bearing 76 which forms the connection between the oscillatory crosshead 52 and the carrier plate 16. The upper part of the plunger 100 is provided with a conical head 102 which enters between stepped blocks 104 carried on the rear ends of the lever arms 12 of the side clamping members 8. It will thus be seen that as the slider 72 is moved in a direction to carry the boss or bearing 76 toward the center of oscillation of the crosshead 52 by means of the chain connection to the hand lever 94 hereinbefore described, the pointed lower end of the plunger 100 will ride up the wedge surface 98 of the slider 74 and by the action of the conical head 102 on the stepped blocks 104 close the side members 8 of the clamp on the sides of the heel seat end of the shoe. As soon as the heel seat end of the shoe is thus clamped, further movement of the slider 72 will be prevented and the boss or bearing 76 that forms the connection between the carrier plate 16 and the crosshead 52 will be in position to cause the path traversed to be appropriate to the size of the heel clamped. The distance through which the slide 72 is moved to clamp the lever arms 12 on the work is in inverse proportion to the size of the heel inserted between them. When the plate 16 is in either position of rest, Figs. 9 and 12, the member 76 lies to the rear of the axis of the crosshead with relation to the lever arms or work clamps. The slide 72 in its movement to clamping position operates boss 76, which in turn moves the plate 16 in the direction of the lever arms. When, therefore, hand lever 94 is operated to clamp the lever arms on the heel, the lever arms and plate 16 are moved forward a distance inversely proportionate to the size of the heel clamped. By such arrangement, the heel is caused to be clamped with the breast edge thereof properly positioned relatively to the means for operating thereon whatever be the size thereof.

Figures 7, 8:
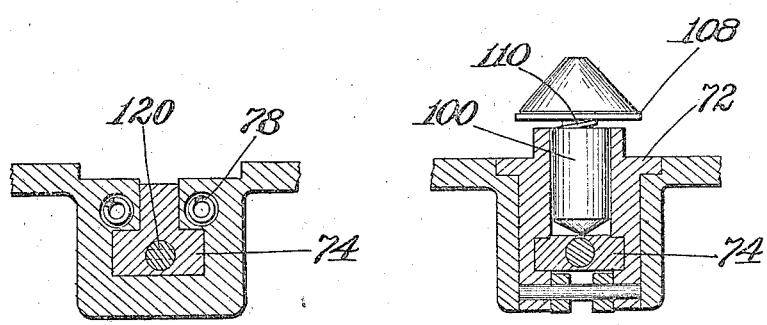
Fig. 7 is a section on the line 7—7 of Fig. 5 showing a detail of construction.
Fig. 8 is a section on the line 8—8 of Fig. 6 showing another detail of construction.

The conical head 102, Figs. 4 and 8, is not directly attached to the plunger 100 but is mounted on a spindle 106 which is received in the plunger 100. Between the base of the cone 102 and the top of the plunger 100 a thin washer or disk 108 is located, this washer being pressed up against the under side of the conical head 102 by a spring 110 surrounding the spindle 106 and bearing at one end against said washer and at its other end against the bottom of a socket in the plunger 100. When the conical head 102 has been raised to separate the stepped blocks 104 on the lever arms 12 the washer 108 will follow this movement and by engaging a pair of the steps on the inclined blocks will lock the lever arms 12 in the position to which they have been brought.

Means for locking together the sliders 72 and 74 in their crosshead 52 so that they will move together during the traversing movement and for unlocking them to permit independent movement during the adjustment will now be described.

The slider 72 carries on its lower side a ratchet toothed block 112, see Fig. 4, with which engages a detent 114 having teeth corresponding in shape and size with the teeth of the rack 112 the detent 114 forming the upper part of a plunger 116 mounted in a bore formed in an extension of the slider 74. The plunger 116 is normally pushed up toward locking position by a spring 118. To release the sliders 72 and 74 to permit relative movement for the purpose of adjustment, means is provided for depressing the plunger 116 against the action of the spring 118, said means comprising a rod 120 carried in the slider 74, see Figs. 4, 7 and 8, and having at its end adjacent to the plunger 116 a crank 122 which engages a slot in the plunger 116. When the rod 120 is turned the movement of the crank in the slot will depress the plunger 116 in opposition to its spring and thus separate the detent 114 from the rack 112. The turning movement of the rod 120 is effected by providing upon its lower side a flat face inclined to the plane of the end of the sleeve 86 whereby when said end of the sleeve engages said flat face it tends to turn the rod to bring the two plane surfaces into one plane. The release of the hand lever 94, by causing the collar 90 to engage the lower end of the sleeve 86 effects the separation of the detent 114 from the rack 112.

The operation of the parts already described may be briefly described as follows:

After the shoe has been placed between the side clamping members 8, the handle end of the hand lever 94 is raised, thus depressing the end which is connected with the rod 88, whereby the rod 88 and chain 80 are drawn downwardly and the slider 72 is moved to carry the connection 76 toward the center of oscillation of the crosshead 52. This movement, by reason of the connection between the slider 72 and the plate 16, moves the heel clamp 6 as a whole outwardly toward the operator. During this movement of the upper slider 72 the stepped surfaces upon the blocks 104 are engaged by the conical head 102 and the levers 12 are moved to close the side clamping arms 8 against the side faces of the heel end of the shoe and through the inclines or cam faces 34 the heel engaging member 10 is moved into contact with the rear face of the heel end of the shoe. In this position, and as shown in Fig. 6, the parts are locked by the thin washer 108. During the clamping operation the boss or bearing 76 which forms the connection between the crosshead 52 and the carrier plate 16 is moved nearer to the center of oscillation of the crosshead to an extent determined by the size of the shoe presented so that when the crosshead 52 is rotated by the gearing 64, 68 the path described by the heel clamp 6 will be controlled as to shape by the horseshoe cam groove 54 but will vary in size in accordance with the variations in the sizes of the heel ends of the shoes presented. The movement of the clamp during its traverse in this path is illustrated in Figs. 9 to 12 which shows the parts in the positions they occupy at four different points in the traverse of the clamp to carry the heel beneath the point of insertion indicated by the reference character 4 applied to the section of the nozzle shown in each of these figures.

After the machine has completed its operation upon a piece of work by performing thereon the required number of fastening inserting operations, the heel clamp moving in the manner described to feed the work for the insertion of the fastenings, the machine is automatically stopped by means hereinafter to be described and the hand lever 94 may then be released. When the hand lever is released, the sleeve 86, acting on the flat face 123 on the rod 120, turns the latter and, by the action of the crank 122 on the plunger 116, moves the detent 114 from the teeth on the rack 112 of the slider 72, allowing the latter to be returned by its springs 78 to its normal position, thus opening the clamp 6 to release the shoe and leave the parts in the position shown in Fig. 5. The next operation will be similar to that already described with the difference that traversing movement will be imparted to the heel clamp by the barrel cam in the return or opposite direction.

As hereinabove suggested the machine, preferably includes mechanism by which it is automatically stopped at the end of the operation upon one shoe and also preferably includes change speed gearing or other mechanism by which the rate of travel of the heel clamp or work holder past the point of insertion of the fastenings can be varied. By varying the rate of travel of the heel clamp or work holder past the point at which the fastenings are inserted, the number of tacks or other fastenings inserted in the heel seat and their distance apart can be varied according to requirements without varying the operation of the fastening inserting mechanism. Thus if a small heel is being operated upon the heel seat carrier or work holder can be moved at a faster rate whereby a lesser number of tacks or nails will be used than in a larger heel although the same distance between the successive tacks may be maintained. By the provision of this mechanism the operator can therefore maintain the number of tacks inserted constant, notwithstanding the variations in sizes of the heels operated upon or he can vary the number and distance apart of the tacks in heels of the same or different sizes.

Figure 2:
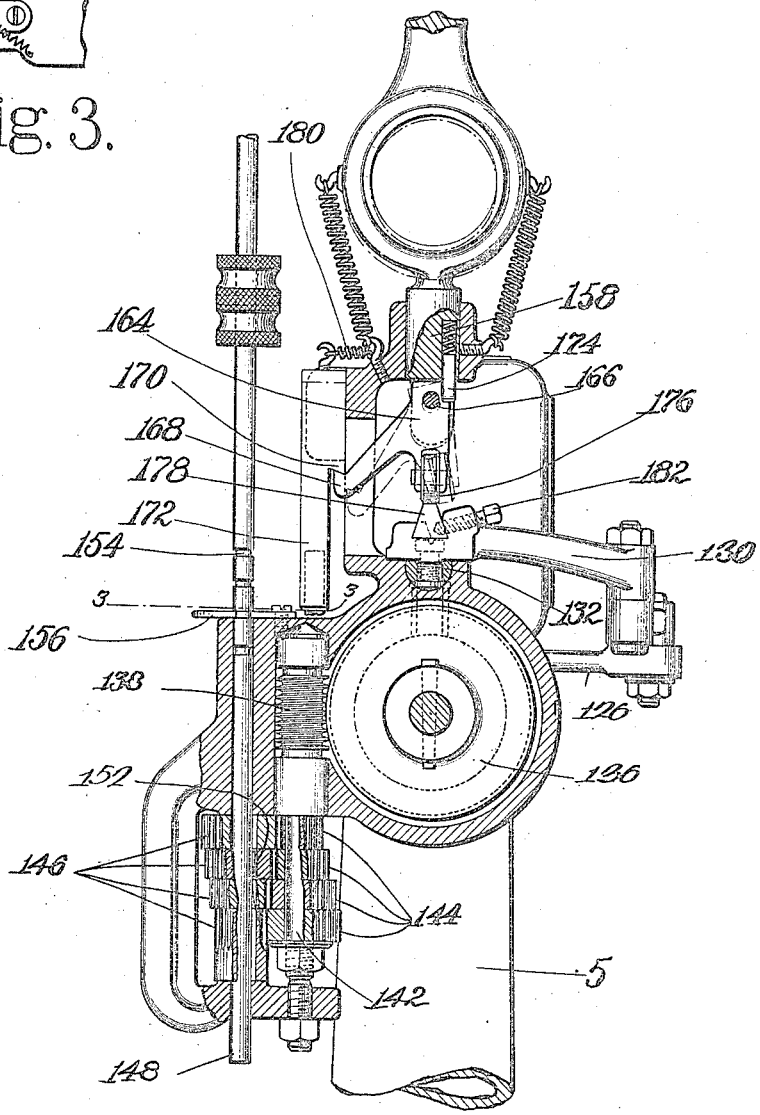
Fig. 2 is a vertical section on the line 2—2 Fig. 1 of a portion of the machine embodying the invention drawn to an enlarged scale.

The change speed and cut out or stop mechanism which acts through the toothed segment 64, already referred to as gearing with the pinion 68 on the hub 70 of the crosshead, preferably is arranged as now set forth and shown in Figs. 1 and 2 of the drawings:

The toothed segment 64 has an outwardly projecting arm 126 which is coupled by a link 128 with an arm 130 which projects from a semi-cylindrical slider 132 arranged in a guideway of similar shape in the machine frame 5. A pin and slot connection between the arm 126 of the segment rack 64 and the link 128 is preferably provided so that adjustment of the point at which the connection is made may be effected.

The semi-cylindrical slider 132 carries on its lower side a roller which extends into a cam groove 134 formed in a barrel cam 136 which is rotated by a worm 138 gearing with worm teeth 140 formed on one end of the barrel 136. The worm 138 is carried on a vertical shaft 142 which also carries one element 144 of each of four or even more sets of gear wheels the other elements of which sets, 146, are mounted on a vertical shaft 148 operated from the driving shaft of the machine by spiral gears one of which 150 is shown in Fig. 1. The gearing shown would drive the shaft 148 continuously but it is obvious that the invention is not restricted to the use of gearing effecting continuous driving. The sets of gear wheels are of different ratios so that four different rates of speed can be imparted to the heel clamp in its traverse and any one of the sets of gear wheels can be thrown into operation by a slide key 152 connecting the selected gear wheel to the vertical shaft. The slide key 152 may be operated by raising or lowering the vertical shaft 148, the slide key being rigidly secured to said shaft, and to maintain the selected gearing in operation a series of annular grooves 154 corresponding to the number of different sets of gears may be provided on the vertical shaft 148, a locking pawl or finger 156, spring pressed toward the shaft 148, being arranged to engage the appropriate groove and hold the shaft in adjusted relation to the set of gears which it is desired to operate.

The shape of the cam groove 134 in the barrel 136 is such that a continuous rotation of the barrel would move the semi-cylindrical slider 132 alternately backward and forward, and, accordingly, automatic clutch mechanism is provided to act to stop the machine when the slider 132 reaches either end of its stroke, this movement of the slider being, of course, equivalent to one complete traverse of the heel clamp 6 past the inserting mechanism and the completion of the operation of inserting fasteners in one heel seat.

The mechanism for automatically stopping the machine at the completion of the operation upon one heel seat and at the end of either stroke of the slider 132 comprises a clutch operating member 158 of the usual wedge-shape, which, when drawn down by springs 160, operates the clutch to start the machine. Conversely, when the clutch operating member 158 is raised in opposition to the springs 160 the clutch will be released and the machine will stop. Means is provided betwen the clutch operating member 158 and the semi-cylindrical slider 132 which causes the operation of the treadle rod 162 to permit the springs 160 to draw down the said member to start the machine, said means being arranged to be operated automatically by the slider 132 to raise the member 158 to stop the machine when said slider reaches either end of its stroke. The said means comprises an arm 164 mounted to swing about a pin 166 on the clutch operating member 158, the arm 164 having a hooked extension 168 which is kept in engagement with a corresponding portion 170 of the slider 172 on the treadle rod 162 by means of a spring plunger 174 bearing against a shoulder upon the arm 164, said plunger 174 being mounted in a socket in the clutch operating member 158. The swinging arm 164 also has mounted on its lower extremity a roller 176 which engages and is lifted by one or the other of two blocks 178 which are adjustably mounted on the top of the semi-cylindrical slider 132. The blocks are so disposed that when the slider reaches either end of its stroke one of the blocks 178 will come into operation to lift the roller 176 and with it the swinging arm 164 and the clutch operating member 158, thus stopping the machine.

To start the machine again for the next operation the treadle is depressed and the engagement of the hooked part 170 of the slider 172 on the treadle rod 162 with the hooked part 168 of the swinging arm 164 will turn the said arm on its pivot 166 in opposition to the spring plunger 174 and move the roller 176 sidewise out of engagement with the block 178 whereupon the springs 160 attached to the clutch operating member 158 may pull the said member down into clutch setting position. As soon as the machine starts the cylindrical slider 132 will carry the block 178 past the roller with which it was engaged so that the spring plunger 174 acts upon the swinging arm 164 to bring it back into line with the blocks whereby the machine will again be stopped automatically when the other block 178 comes beneath the roller 176. All of this assumes that the operator has released the treadle after starting the machine. The slider 172 attached to the treadle rod 162 is yieldingly held in operative position against the side of the machine by a spring 180 so as to limit the turning movement of the swinging arm 164, the treadle rod being lifted into its normal raised position by another spring (not shown) in the base of the machine.

The blocks 178 on the semi-cylindrical slider 132 are preferably made adjustable to facilitate proper timing of the mechanism to insure that one of the blocks 178 will operate to throw out the clutch exactly at the end of a complete traverse of the heel clamp. Such adjustment may be secured in any suitable manner and the blocks may be held in adjusted position by set screws 182 as shown in Fig. 2

Figure 15:
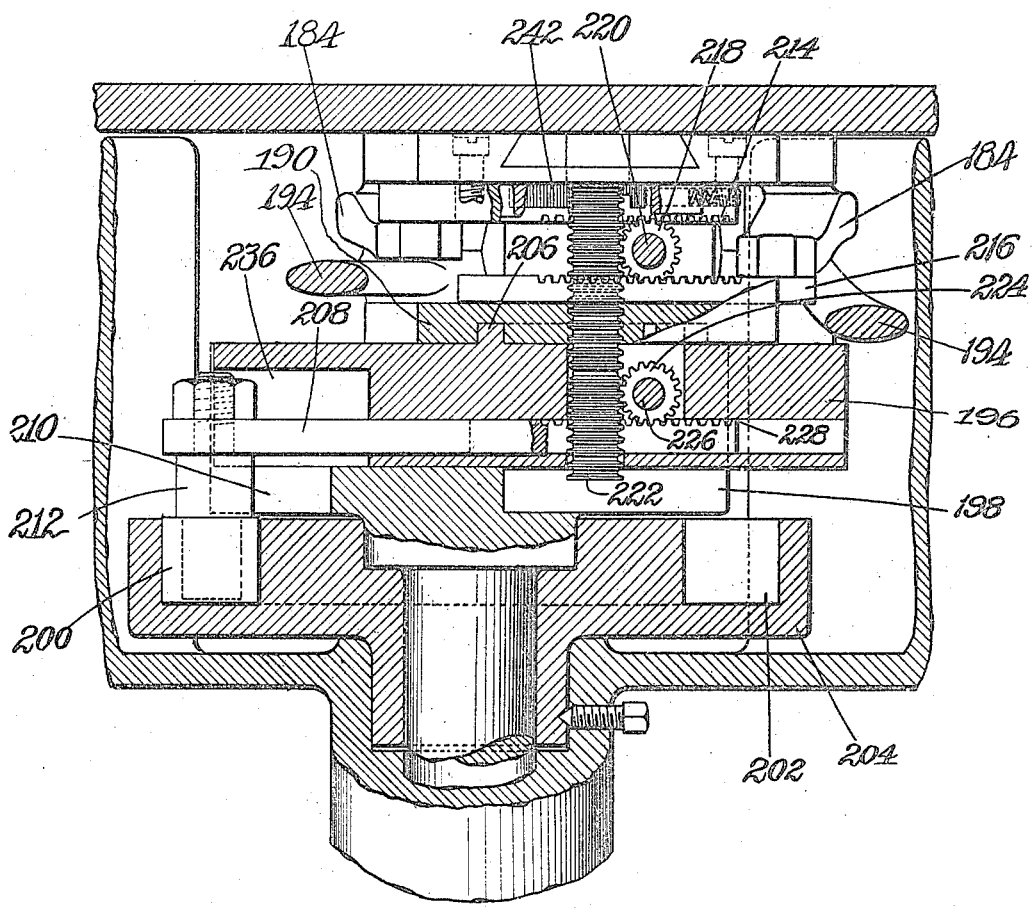
Fig. 15 is a section on the line 15—15 of Fig. 14 with one of the principal members of the adjusting mechanism hereinafter described turned to a position corresponding with the line on which the section is taken.

In the modified construction of the machine as shown in Figs. 13 to 15 the arrangement is similar to that already described in that mechanism is employed to insert tacks or nails into a heel seat that is held in and traversed by a heel clamp in a predetermined path beneath the inserting mechanism. In this construction, however, the presentation of the heel to the machine automatically determines the path to be described by the clamp and also automatically effects the locking together of the parts in the position into which they have been brought, the path of traverse being determined by the size of the heel.

The heel clamp, as in the construction already described, comprises two lever arms 184 adapted to engage the sides of the heel seat at the heel end of the shoe and a member 186 adapted to engage the rear face of the heel, the latter member in this construction acting as a gage and operating to lock the mechanism by which the path of movement of the heel clamp is correlated with the size of the heel.

The lever arms 184 are pivoted at two points 188 on a carrier plate 190 and are provided at their rear ends with means hereinafter described to cause them to move together and at the same time to effect the necessary adjustment of the point of connection of the carrier plate 190 with its actuating means whereby the path of movement of the said plate will be varied. The lever arms 184 are normally in closed position, that is, they are normally pressed toward each other by springs 192 each of which surrounds the fulcrum pin 188 on its respective arm and bears at one end upon a pin on the lever arm and at its other end upon a pin on the carrier plate 190.

As in the construction already described, the carrier plate 190 is constrained from rotary motion but receives traversing movements in two directions, the movements being so compounded that the plate and the parts sustaining the heel will be moved in a path which follows the contour of the heel seat. Instead of the T-shaped slider employed in the previous construction to restrain the carrier plate 190 from angular movement, two links 194 are employed, said links being connected with the carrier plate at their forward ends while their rear ends are pivoted to a member (not shown) that slides in the frame of the machine.

The carrier plate 190 is carried on a member 196 mounted in a groove in an oscillatory crosshead 198 which is preferably turned by a pinion and toothed segment such as already described in connection with the description of the first construction. The member 196 moves in relation to the crosshead 198 along a diameter of said crosshead as the latter is oscillated, such movement being effected through a cam roll 200 connected to said member and engaging a cam groove 202 in a stationary part 204 of the machine. The connection between the carrier plate 190 and the member 196 is preferably formed by an annular projection 206 on one of said parts engaging an annular recess in the other, the center of said projection constituting the point about which the parts have relative rotary movement.

To enable the traverse of the heel clamp to be varied to suit different sizes of heels the cam roll 200 is connected with the member 196 through a slide bar 208 which, by means to be described, can be adjusted in relation to said member so as to position the point of connection of the carrier plate and member nearer to or farther from the center of oscillation of the crosshead 198. To maintain a driving connection between the crosshead 198 and the member 196 and at the same time to permit the adjustment of the roller in relation to said member a slot or recess 210 is provided in the crosshead, the sides of this slot engaging the spindle 212 which carries the cam roll 200. The adjustment of the slide bar 208 to suit the particular heel inserted in the clamp is effected through the following means.

The lever arms 184 are coupled at their rear ends by pin and slot connections with racks 214, 216, the former being arranged above and the latter below the pinion 218 which is mounted on a spindle 220 carried in a bearing in the carrier plate 190. The pinion 218 also meshes with a rack 222 the teeth of which also mesh with another pinion 224 mounted on a spindle 226 carried in a bearing in the member 196. The rack 222 is mounted centrally with respect to the annular projection 206 and is cylindrical in form with the rack teeth extending circumferentially around it so as to permit relative turning movement of the parts without disengagement of their pinions therefrom. The pinion 224 also meshes with rack teeth 228 formed in the upper face of the slide bar 208.

The operation of the parts thus far described is as follows: When the heel end of the shoe is thrust between the rolls 230 carried on the lever arms 184 the outer ends of the said levers will be forced apart in opposition to the springs 192. This will have the effect of moving the rear ends of the lever arms toward each other to an amount determined by the size of the heel. Through the racks 214, 216 the pinion 218 will be turned thereby imparting to the rack 222 an upward movement proportionate to the movement of the lever arms. The upward movement of the rack 222 will turn the pinion 224 and as the teeth of this pinion are restrained from movement by the engagement of the cam roll 200 on the slide 208 with the groove 202 in the stationary part 204, the pinion 224 will travel outwardly from the center of oscillation of the crosshead carrying with it the member 196 and through the connection between said member 196 and the carrier plate 190 the said carrier plate and the parts carried thereby will also be moved. The amount of such displacement from the center of oscillation of the crosshead will vary in accordance with the size of the heel seat at that time in the clamp and the travel of the shoe clamp when the crosshead is oscillated will correspondingly be adjusted to suit the size of the heel.

The cam roll 200 is mounted on the slide 208 by a bolt and nut connection and a recess 236, as shown in Fig. 15, is provided in the member 196 of sufficient length to accommodate the nut in its adjustment in relation to said member.

In order to lock the lever arms 184 in the position into which they have been brought by the insertion of the heel into the clamp, the rack 214 is provided with a projecting part 238, see particularly Fig. 13, in which a plate or block 240 is mounted so as to slide forwardly and rearwardly. The plate or block is provided at its rear end with teeth 242 adapted to engage teeth 244 upon a downwardly projecting portion of the carrier plate 190, when the heel seat has been inserted in the clamp and the heel end of the shoe pressed against the heel rest 186 to move the plate or block 240 rearwardly to cause such engagement. The said plate is provided with a recess having an inclined face 246 against which bears a pin 248 secured to the heel rest or gage 186. To prevent the teeth 242 from becoming disengaged from the teeth 244 in the event of the shoe being moved away from the heel rest or gage 186 during the operation of the machine on the shoe, thereby allowing the levers 184 to become unlocked, a spring plunger 250 mounted in the projecting part 238 of the rack 214 enters a recess 252 in the block 240 when the teeth 242 and 244 are moved into engagement. A spring 254 secured to the carrier plate 190 acts on the pin 248 and tends to maintain the rest 186 forward and the teeth 242 out of engagement with the teeth 244.

Having thus described my invention, what I claim as new and desire to secure by Letters Patent of the United States is:—

1. Work feeding and guiding mechanism comprising, in combination, a work holder, means including a single work holder operating element for moving said work holder bodily along a path corresponding substantially to the contour of the work received in said holder, and means for controlling the movement of said element to vary the size of the contour path described by said work holder in accordance with variations in the sizes of the work.

2. Work feeding and guiding mechanism comprising, in combination, a work holder, means for moving said work holder to carry the work bodily along a path corresponding substantially to the contour of the work, and means controlled by the presentation of the work to said work holder for suiting the path of traverse of said work holder to the size of the work.

3. In a machine of the class described, comprising means for operating upon the work, a work holder, means for causing said work holder to carry the work past the point of operation thereon along a path corresponding substantially to the contour of the work while constantly presenting the same face of the work to the operator, and means controlled by the presentation of the work to said work holder for varying the path of movement of said work holder to adapt it to variations in the work.

4. The combination with means for operating on a shoe, and a work holder arranged to carry the shoe past the operating means, of means set by the presentation of the shoe to said work holder whereby the path of the relative traversing movement of the operating means and the work holder is automatically determined by the size of the shoe being operated upon.

5. In a machine of the class described, the combination with means for operating upon the work, of means for carrying the work past said operating means, means for constraining the carrying movement of said carrying means to a determined path, and means governed by a characteristic of the work for causing the said constraining means to predetermine a path for said carrying means which is suited to said work characteristic.

6. In a machine of the class described, the combination with means for operating upon the work, of a single means for feeding and guiding said work past said operating means, and means for operating said feeding and guiding means constructed and arranged to be set by the presentation of the work to said feeding and guiding means to cause said feeding and guiding means to feed the work along a path determined by a characteristic of the work.

7. In a machine of the class described, means for operating upon the work, means for transporting the work bodily past said operating means to bring successive points on the work into operative relation thereto, means for constraining said transporting means to a predetermined path of movement, and means controlled by a characteristic of the work as it is presented to said transporting means for effecting the predetermination of said path.

8. In a machine of the class described, the combination with work holding means comprising coöperating elements arranged to caliper a dimension of the work, of means for moving said work holding means along a path corresponding substantially to the contour of the work, and means governed by the relative position of the coöperating calipering elements of said work holding means for varying the contour dimensions of said path in accordance with variations in the corresponding dimensions of the work.

9. In a machine of the class described, the combination with work holding means constructed to embrace the heel end of a shoe, of means for moving said work holding means along a path corresponding in shape substantially to the contour of said heel end, and means whereby the engagement of said shoe by said work holding means effects a variation in the dimensions of the path of movement of said means corresponding to variations in the size of the work presented to said work holding means.

10. Work feeding and guiding mechanism comprising, in combination, a work holder, means for supporting said work holder constructed and arranged for rectilinear movement of said holder in directions normal to each other, and means for compounding the rectilinear movements of said holder into a movement corresponding to the contour of the heel end of a shoe, said means comprising an operating element for the work holder and means for varying the action of the operating element on the work holder in accordance with the contour of the work.

11. Work feeding and guiding mechanism comprising, in combination, a work holder adapted to embrace the heel end of a shoe, means for supporting said holder constructed and arranged for rectilinear movements of said holder in directions substantially normal to each other, and means for compounding said rectilinear movements to cause said holder to follow a path corresponding to the contour of the heel end of said shoe without angular movement of the shoe, said means comprising an operating element for the work holder and means for varying the action of the operating element on the work holder in accordance with the contour of the work.

12. In a machine of the class described, work feeding and guiding mechanism comprising a work holder adjustable to different sizes of shoes, means for moving said holder along a path corresponding to the contour of the part of the shoe embraced by said holder, and means for effecting a two-dimensional adjustment of said work holder constructed to effect a corresponding change in two dimensions of the contour path described by said work holder.

13. In a machine of the class described, means for operating upon the work arranged to operate at a fixed point, a work holder movable past said point to bring successive points upon the work into operative relation to said operating means, and means for adjusting said work holder to the size of the work, operating to maintain such a relation between said holder and said operating means that said holder presents different sizes of work in the same operative relation to said fixed point of operation.

14. In a machine of the class described, the combination with a tool arranged to operate on the work at a fixed point, of a work holder movable past said tool along a path corresponding substantially to the contour of the portion of the work received in said holder, and means for effecting a two-dimensional adjustment of said holder to suit it to the size of the work, operating to cause said holder to present work of different sizes in substantially the same relation to said tool for the initial operation.

15. In a machine of the class described, work feeding and guiding mechanism comprising a clamp, mechanism comprising a single operating element for moving said clamp along a predetermined path, and means operating to set said mechanism to alter the path of movement of the clamp in accordance with variations in the sizes of the work clamped.

16. In a machine of the class described, work feeding and guiding mechanism comprising a clamp that is normally closed, means for moving said clamp along a predetermined path, and means whereby the act of inserting the work in the clamp will, according to the size of the work and the extent to which the clamp is thereby opened, set said mechanism to alter the path of movement of the clamp.

17. In a machine of the class described, a work-engaging member, a rotatable member for operating said work-engaging member, and means controlled by the work for adjustably connecting the rotary member to the work-engaging member.

18. In a machine of the class described, a work-engaging member, a rotatable member for operating said work-engaging member, a part movable relatively to the rotatable member and joined to the work-engaging member for operatively connecting said work-engaging member to said rotatable member, and means for controlling the movement of said part relatively to said rotatable member.

19. In a machine of the class described, a work-engaging member, a rotatable member for operating said work-engaging member, a part movable relatively to the rotatable member and joined to the work-engaging member for operatively connecting said work-engaging member to said rotatable member, and fixed means for controlling the movement of said part relatively to said rotatable member.

20. In a machine of the class described, work feeding and guiding mechanism comprising a work holder, an oscillatory member from which said work holder receives its work feeding movement, a slide carried by and movable relatively to said oscillatory member and to which said work holder is connected, and means controlling the relative movement of said oscillatory member and said slide to determine the path of movement of said work holder.

21. In a machine of the class described, a work-engaging member, a rotatable member for operating said work-engaging member, a part movable relatively to the rotatable member and joined to the work-engaging member for operatively connecting said work-engaging member to said rotatable member, means for controlling the movement of said part relatively to said rotatable member, and means for varying the relative locations of the point of connection of said work-engaging member with said part and the point of connection of said part with said controlling means.

22. In a machine of the class described, work feeding and guiding mechanism comprising a clamp constructed and arranged for rectilinear movements in directions normal to each other, means for moving said clamp including a rotatable member to which said clamp is connected, and means whereby the operation of adjusting the clamp to the work varies the distance from the center of rotation of said rotatable member to the point of connection between the clamp and the said member in accordance with variations in the sizes of the work clamped.

23. In a machine of the class described, work feeding and guiding mechanism comprising a work holder, an oscillatory member from which said work holder receives its work feeding movement, a slide carried by and movable relatively to said oscillatory member and to which said work holder is connected, and a cam controlling the relative movement of said oscillatory member and said slide to determine the path of movement of said work holder.

24. In a machine of the class described, work feeding and guiding mechanism comprising a work holder, an oscillatory member from which said work holder receives its work feeding movement, a slide carried by said oscillatory member and to which said work holder is connected, a cam controlling the relative movement of said oscillatory member and said slide to determine the path of movement of said work holder, and means for varying the relative locations of the point of connection of said work holder with said slide and the point of connection of said slide with said cam.

25. In a machine of the class described, work feeding and guiding mechanism comprising a work holder, an oscillatory member from which said work holder receives its work feeding movement, a slide carried by said oscillatory member and to which said work holder is connected, a cam controlling the relative movement of said oscillatory member and said slide to determine the path of movement of said work holder, and means operated by the adjustment of the work holder to the work for varying the relative locations of the connection between the work holder and the slide and the connection between said slide and the cam.

26. In a machine of the class described, work feeding and guiding mechanism comprising a work holder, an oscillatory member from which said work holder receives its work feeding movement, a slide carried by said oscillatory member and arranged to slide along the radius thereof, said work holder being connected to said slide, a cam controlling the relative movement of said slide and said oscillatory member to determine the path of movement of said work holder, and means for varying the distance from the center of oscillation of said oscillatory member to the point of connection between said work holder and said slide whereby the path of movement of said work holder is altered in size but not in form.

27. In a machine of the class described, work feeding and guiding mechanism comprising a work holder, means for preventing angular movement of said work holder, constructed to permit rectilinear movement thereof in directions substantially normal to each other, a cam having the contour of the part of a shoe to be operated upon for compounding the rectilinear movements of said work holder into a bodily movement thereof along a path having said contour, a member connected to the work holder and having a part coöperating with said cam, and means for moving said member angularly with relation to said cam.

28. In a machine of the class described, a work holder comprising laterally movable members for engaging the sides of a shoe, a member for engaging an end of said shoe, and connections between said side engaging members and said end engaging member for moving said end engaging member longitudinally a distance proportional to the lateral movement of said side engaging members.

29. In a machine of the class described, a work holder comprising members for engaging the sides of a shoe, a member for engaging the end of said shoe, and means operating upon movement of the side engaging members to effect a proportional adjustment of the end engaging member to bring a shoe of the size engaged into proper relation to the side engaging members.

30. In a machine of the class described, the combination with means for operating upon the work and a work holder for carrying the work past said operating means, of means for moving said work holder in a path corresponding substantially to the contour of the work, and means whereby the adjustment of said holder to the work effects an initial movement of said work holder to locate in proper relation to the operating means work of the particular size contained in said work holder.

31. In a machine of the class described, the combination with means for operating upon the work and a work holder for carrying the work past said operating means, said work holder comprising members for engaging the sides of the shoe and a member for engaging the end of said shoe, of means operating upon movement of the side engaging members to effect adjustment of the end engaging member to bring a shoe of the size engaged into proper relation to the side engaging members and, simultaneously, an adjustment of said work holder to bring work of the size engaged into proper relation to said operating means for the initial operation.

32. In a machine of the class described, a tool operating upon the work at a fixed point and work feeding and guiding mechanism constructed and arranged to carry the work bodily past said point, said mechanism comprising means for moving said holder in a path corresponding substantially to the contour of the portion of the work which is being operated upon and means for varying the path of movement in accordance with variations in the sizes of the work, said last-mentioned means being constructed to effect also a bodily adjustment of said work holder with respect to said point of operation to insure a substantial uniformity of relationship between the tool and the work for the initial operations upon different sizes.

33. In a machine of the class described, means for operating upon the work, a work holder, means for moving said work holder bodily past said operating means along a path corresponding substantially to the contour of the work, means for varying the size of the contour path described by said work holder in accordance with variations in the size of the work and means for varying the speed of traverse of said work holder past said operating means.

34. In a machine of the class described, means for operating upon the work, a work holder, means for effecting a bodily feeding movement of said work holder past said operating means along a path corresponding substantially to the contour of the work, and means for varying the length of the feeding movement without affecting the path of movement of the work.

35. In a machine of the class described, means for operating upon the work, a work holder, means for effecting a bodily feeding movement of said work holder past said operating means along a path corresponding substantially to the contour of the work, and means controlled by the size of the work received in said work holder for effecting variations in the feed in accordance with variations in the sizes of the work.

36. In a machine of the class described, a work-engaging member, a rotatable member for operating said work-engaging member, and means controlled by a part of the work-engaging member for locking the work-engaging member in operative relation to the rotatable member.

37. In a machine of the class described, a work-engaging member comprising a part adapted to be engaged by the end of the work, a rotatable member for operating said work-engaging member, and means controlled by said part for locking the work-engaging member in operative relation to the rotatable member.

38. In a machine of the class described, comprising means for operating upon the work, a work holder arranged to carry the work past the point of operation thereon along a path corresponding substantially to the contour of the work, and means for continuously moving the work holder relatively to the operating means during the operation of said means.

In testimony whereof I have signed my name to this specification in the presence of two subscribing witnesses.

WILLIAM THOMAS BUCKINGHAM ROBERTS.

Witnesses:
FREDERICK WILLIAM WORTH,
CECIL HERBERT CROSS.

Copies of this patent may be obtained for five cents each, by addressing the "Commissioner of Patents, Washington, D. C."